(No Model.)
C. W. GLIDDEN & H. W. WINTER.
HEEL TRIMMING MACHINE.
No. 505,043. Patented Sept. 12, 1893.
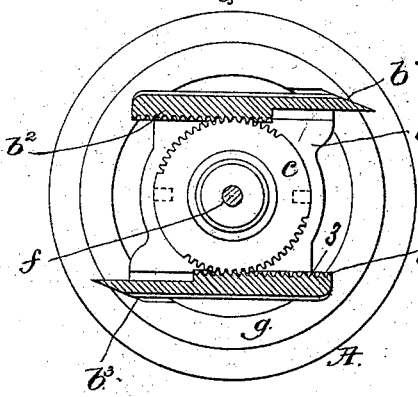
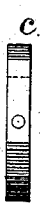
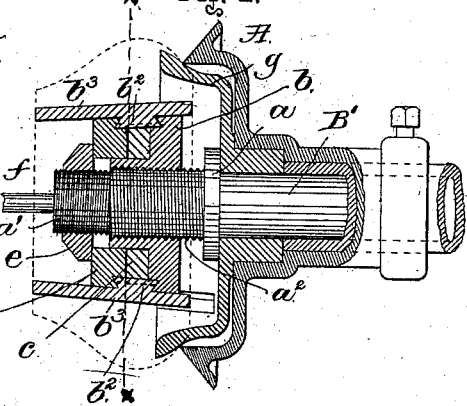
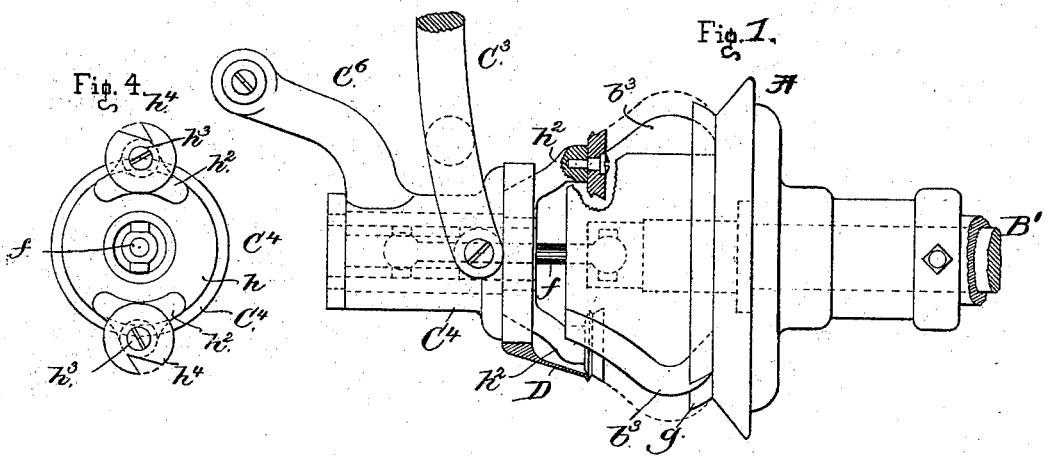
Witnesses.
Edgar A. Godden
Frederick L. Emery
Inventors.
Charles W. Glidden
Henry W. Winter
by Crosby Gregory Attys.

United States Patent Office.

CHARLES W. GLIDDEN, OF LYNN, AND HENRY W. WINTER, OF BOSTON, ASSIGNORS TO JAMES W. BROOKS, TRUSTEE, OF PETERSHAM, MASSACHUSETTS.

HEEL-TRIMMING MACHINE.

SPECIFICATION forming part of Letters Patent No. 505,043, dated September 12, 1893.

Application filed August 25, 1888. Renewed May 18, 1889. Serial No. 311,307. (No model.)

*To all whom it may concern:*

Be it known that we, CHARLES W. GLIDDEN, of Lynn, county of Essex, and HENRY W. WINTER, of Boston, county of Suffolk, State of Massachusetts, have invented an Improvement in Heel-Trimming Machines, of which the following description, in connection with the accompanying drawings, is a specification, like letters and figures on the drawings representing like parts.

This invention has for its object to improve that class of heel trimming machines employing a rotary molded cutter having a tread guard.

In this invention the rotary cutter has combined with it a throat plate which limits the depth at which the blades next the tread guard shall cut into the heel. The blades of the cutters are provided with teeth which are engaged by teeth of a gear located upon or within the clamping hub carrying the blades, so that the said blades may be simultaneously adjusted for grinding. The rand cutter next the rand or counter guard, is composed of a rotating disk or plate to which is secured one or more disk like cutters slotted to form throats as will be described.

Our invention consists essentially in the combination with a rotary cutter, of an independent throat plate interposed between the blades of the cutter and the usual tread guard.

Other features of our invention will be hereinafter described and specified in the claims at the end of this specification.

Figure 1 is a side elevation partially broken out of a sufficient portion of a heel trimming machine embodying our invention, to enable the same to be understood; Fig. 2 a partial longitudinal section of the parts shown in Fig. 1; Fig. 3 a section of Fig. 2 in the dotted line $x$, the connecting link being in section. Fig. 4 is a detail showing the rand cutters and the parts carrying them, and Fig. 5 an edge view of the toothed wheel $c$.

The main rotary shaft $B'$ and the tread guard A loose on the bearing box for the said shaft, and the rand or counter guard D, are and may be substantially as in application, Serial No. 275,880, filed June 2, 1888, where like letters and numerals are employed to designate like parts.

The shaft $B'$ is provided at its outer end with a short left hand thread $a'$, and just beyond it a larger part of the said shaft is provided with a right hand thread $a^2$. The right hand threaded portion of the said shaft has screwed upon it the portion $b$ of the cutter head $b\ b'$, the other portion $b'$ being a plate slipped over the hub of the portion $b$ loosely. The portions $b\ b'$ of the cutter head are provided each with an angular slot or groove constituting one half of a dovetailed groove to receive a dovetailed projection $b^2$ at the inner side of each blade $b^3$ of the cutter, the said projection being toothed as shown at 2, Fig. 3. The hub of the cutter head portion $b$, has fitted to it to turn thereon a gear $c$, the teeth of which as best shown in Fig. 3 engage the teeth 2 of the cutter blades $b^3$ to simultaneously adjust the same with relation to the shaft $B'$. The dovetailed portions of the blades when adjusted are clamped firmly between the portions $b\ b'$ by means of a clamping nut $e$ applied to the left hand threaded portion of the shaft $B'$. These right and left hand threads are so disposed that all the strains on the cutter head tend to tighten the hold of the head upon the blades rather than loosen the hold thereon.

It will be noticed that the portion $b$ of the head may be adjusted longitudinally toward or from the tread guard and throat plate $g$ to be described, and that the portion $b'$ may by the nut $e$ be made to co-operate with the portion $b$ in any and all of its adjustments, to hold the blades in place, the longitudinal adjustment of the cutter head as described enabling it to trim heels differing in shape as more fully set forth in United States application, Serial No. 276,959.

The shaft $B'$ has a collar $a$ between which and the hub the tread guard is interposed loosely; the hub of the throat $g$ is made of disk shape and notched at its edge as shown in Fig. 1, to receive the edges of the cutter blades $b^3$, a portion of the said throat projecting a little beyond the path of movement of that edge of the cutter nearest the tread guard, and another portion of the throat plate lying within and back of the path of movement of the edges of the cutter blades as best shown in Fig. 2. This location of the throat plate obviates cutting or trimming the outer edge or corner of the top lift of the heel, so that if properly shaped it retains its shape, the rest of the heel being trimmed by the cutting blades to the top lift, or partially it may be across it, according to the shape of the throat plate.

Prior to our invention we are aware that the tread guard has had an annular lip like tooth to guide the tread corner of the top lift.

The counter guard D is fixed to a carriage $C^4$ supported by a link $C^3$, the said carriage having an arm $C^6$ extended from it as in application Serial No. 278,144.

The carriage contains a hub $h$ which is engaged by a connecting rod $f$ ball-jointed to both the said hub and shaft $B'$, so that the said shaft rotates the said hub. The hub has connected to or forming part of it, suitable arms or ears $h^2$, to which are connected by screws or bolts $h^3$, the disk cutters $h^4$, which in the rotation of the hub act to cut the rand, a portion of the edge of each disk cutter nearest the cutter head overlapping somewhat the edges of the blades $b^3$, thus avoiding a fin next the rand.

We do not desire to limit our invention to the shape shown for the blades of the cutter. The throat plate $g$ rotates in unison with the cutter.

Rotary cutters used for trimming heels have to be revolved very rapidly and the blades are subjected to very considerable strain and have to be held securely and in such manner as to preclude breaking. Where a blade is grooved to be entered by a holding edge or edges, it is obvious that this groove weakens the material of the blade where it should be strongest, and that the pressure used to hold the blade is an outward strain exerted wholly on the blade and in a direction to disrupt it, but by providing a blade with a dove-tailed rib-like projection extending from the back of the blade, the blade is made thicker transversely in the line of the rib, thus strengthening the blade, and by grasping the said rib or projection between the inner faces of two disks forming part of a cutter head, it is impossible to exert any disrupting strains, as stated. It will also be seen that by employing two disks $b$, $b'$, to grasp the projection $b^2$ between them, the cutter head composed essentially of said disks may be put upon a threaded portion $a^2$ of the shaft and yet be adjusted as desired to put the blades of the head in working position.

We claim—

1. The combination with the rotary cutter and tread guard, of an independent throat plate as $g$, to operate substantially as described.

2. A rotary cutter composed of a blade provided on its inner surface between its side edges with a longitudinally arranged strengthening and clamping rib standing out from the body of the blade, said rib being of irregular cross section, and a two-part cutter head constructed substantially as described and adapted to engage said rib and clamp and hold the cutter blade in working position, said cutter being adapted to be adjusted longitudinally between the said heads to provide for alterations in position of the blade after grinding, substantially as described.

3. The shaft $B'$ having oppositely inclined screw threads, the two part cutter head $b\ b'$, the part $b'$ being movable on the hub of the part $b$, combined with the nut $e$, and with the cutter blades, to operate substantially as described.

4. The cutter blades having the toothed projections at their backs, and the two part cutter head $b\ b'$ shaped to grasp and hold the said projections, combined with the toothed plate by which to simultaneously adjust the said blades, substantially as described.

5. The shaft $B'$ having the right and left hand threads, and the cutter head and cutting blades, and a nut as $e$, combined with the disk shaped tread guard, the said head carrying the said blades being adjustable longitudinally on the said shaft toward and from the said tread guard, substantially as described.

6. The combination with a rotary cutter, and a rand guard, and a support for the said rand guard independent of the said rotary cutter and its shaft, of an independent hub separated by the rand guard and having a plate and a plurality of disk like cutters carried by the said plate, substantially as described.

7. The cutter shaft having a threaded portion $a^2$, and the two-part cutter head composed of plates $b$, $b'$, one of the said plates being threaded to fit the threads of the said shaft, combined with the blades having the projecting ribs $b^2$, and a nut to act upon one of the said plates to effect the clamping of the projections of the blades, the rotation of the plates upon the threaded cutter shaft and the adjustment of the nut permitting the longitudinal adjustment of the cutter head and its attached blades upon the said shaft, to operate, substantially as described.

In testimony whereof we have signed our names to this specification in the presence of two subscribing witnesses.

CHARLES W. GLIDDEN.
HENRY W. WINTER.

Witnesses for C. W. Glidden:
H. P. FAIRFIELD,
C. H. BENJAMIN.

Witnesses for H. W. Winter:
OLIVE H. PITTMAN,
HENRY M. ESSELEN.